United States Patent [19]
Ho et al.

[11] Patent Number: 5,610,744
[45] Date of Patent: Mar. 11, 1997

[54] OPTICAL COMMUNICATIONS AND INTERCONNECTION NETWORKS HAVING OPTO-ELECTRONIC SWITCHES AND DIRECT OPTICAL ROUTERS

[75] Inventors: Steven H. Ho, Urbana, Ill.; Evandro Conforti, Campinas, Brazil; Sung M. Kang, Champaign, Ill.

[73] Assignee: Board of Trustees of the University of Illinois

[21] Appl. No.: 389,897

[22] Filed: Feb. 16, 1995

[51] Int. Cl.⁶ .................................................. H04J 14/00
[52] U.S. Cl. ......................... 359/118; 359/125; 359/133; 359/179
[58] Field of Search .................... 359/115, 118, 359/119, 124, 128, 125, 164, 173, 179, 133

[56] References Cited

U.S. PATENT DOCUMENTS

| | | | |
|---|---|---|---|
| 4,642,804 | 2/1987 | Personick | 359/126 |
| 4,730,301 | 3/1988 | McMahon | 359/119 |
| 4,901,306 | 2/1990 | Gardner | 359/125 |
| 5,005,937 | 4/1991 | Aida et al. | 359/179 |
| 5,127,067 | 6/1992 | Delcoco et al. | 359/118 |
| 5,289,302 | 2/1994 | Eda | 359/123 |
| 5,317,198 | 5/1994 | Husbands | 359/118 |
| 5,343,314 | 8/1994 | Nakamura et al. | 359/123 |
| 5,351,146 | 9/1994 | Chan et al. | 359/118 |
| 5,369,515 | 11/1994 | Majima | 359/123 |
| 5,457,556 | 10/1995 | Shiragaki | 359/128 |

OTHER PUBLICATIONS

Monolithic Optical Equalizer Array for Wavelength–Reusable and Topology–Reconfigurable WDM Local Area Networks, published in the U.S. at the Annual Conference of IEEE Laser and Electro–optics Society in Nov., 1993.

A series of transparencies shown at the Annual Conference of IEEE Laser and Electro–optics Society in Nov., 1993.
Wavelength–reusable And Topology–Reconfigurable WDM Optical Networks For High–speed Multicomputer and Lan Networks, Supercomputing '93 Conference.
An excerpt of a program published in the U.S. in Nov., 1993, taken from Reference C.
A series of transparencies shown at the Supercomputing '93 Conference in Nov., 1993.
Large–and small–signal gain characteristics of 1.5 μm multiple quantum well optical amplifiers, G. Eisenstein, et al. Appl. Phys. Lett. vol. 56, No. 13, 26 Mar. 1990, pp. 1201–1203.
A multiple Quantum Well Optical Amplifier/Modulator Integrated with a Turnable DBR Laser, G. Eisenstein, et al., Proceedings of the 7th International Conference on Integrated Optics and Optical Fiber Communications, Kobe Japan, Jul. 1989, pp. 117–120.
Two–Section Semiconductor Optical Amplifier Used as an Efficient Channel Dropping Node, C. Jorgensen, et al. IEEE Photonics Technology Letters, vol. 4, No. 4, Apr. 1992, pp. 348–351.

*Primary Examiner*—Wellington Chin
*Assistant Examiner*—Rafael Bacares
*Attorney, Agent, or Firm*—Greer, Burns & Crain, Ltd.

[57] ABSTRACT

A multiple wavelength optical network includes a plurality of nodes, each of which can receive and transmit multiple wavelengths. The nodes include at least one fixed wavelength switched optical coupler and at least one direct coupler, so that the signals of high volume and other users can pass directly through the nodes without interruption. Wavelengths can be reused, even when there is a direct connection, by saturating a series of amplifiers in a direct coupler to erase the information signal from the carrier. The carrier signal is not interrupted, and can be remodulated immediately with another information signal.

13 Claims, 14 Drawing Sheets

– – – – – USERS DESIRED COMMUNICATION TOPOLOGY

▰▰▰▰▰ FIXED PHYSICAL NETWORK TOPOLOGY

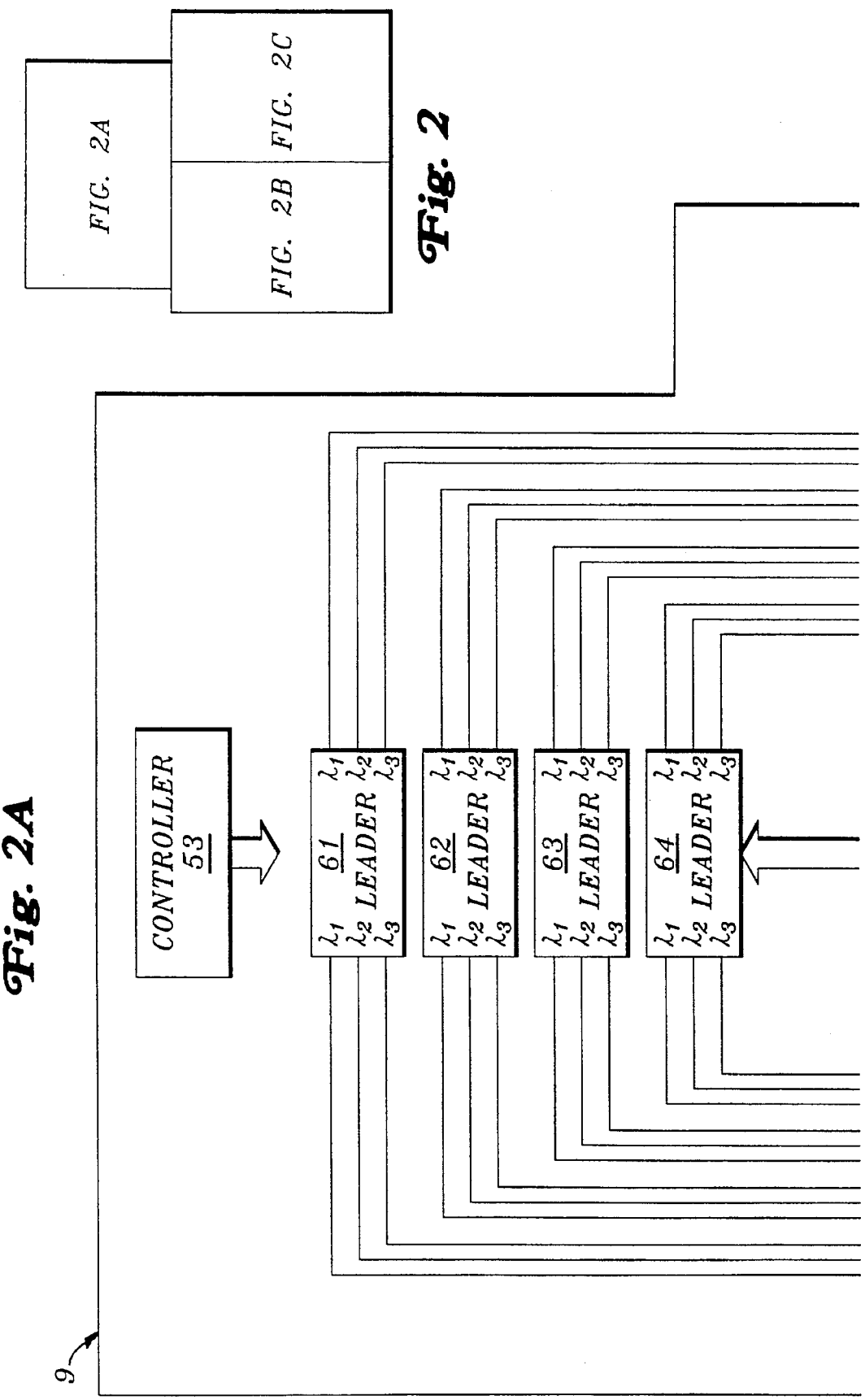

| FIG. 3A | FIG. 3B | FIG. 3C |

*Fig. 3A*

CONTROLLER 53

| 61 LEADER | 62 LEADER | 63 LEADER | 64 LEADER |

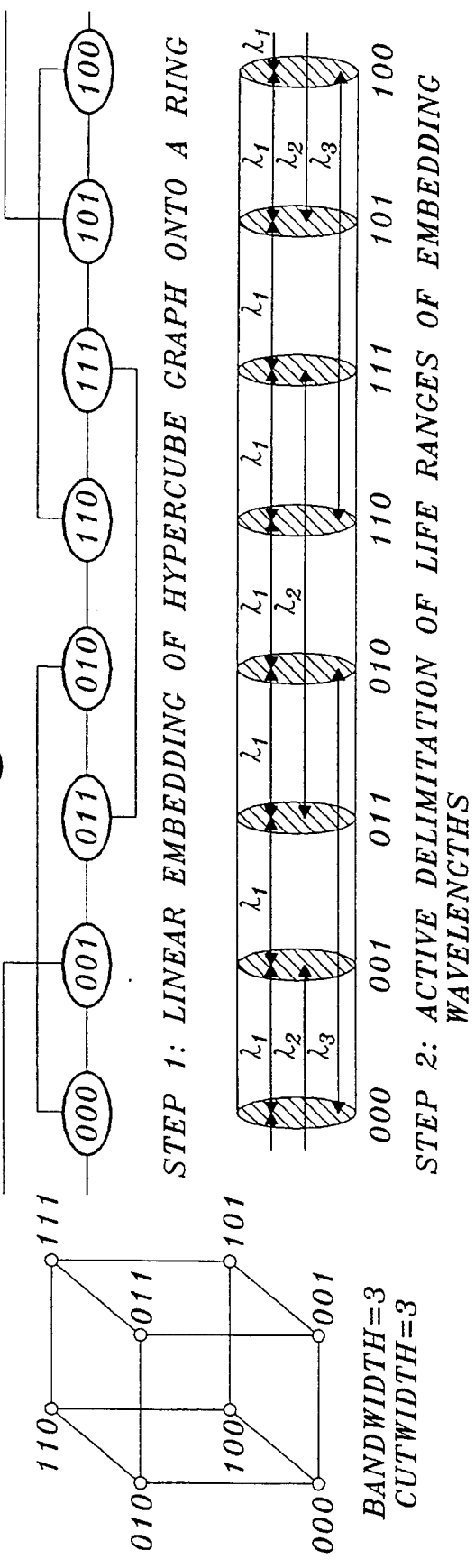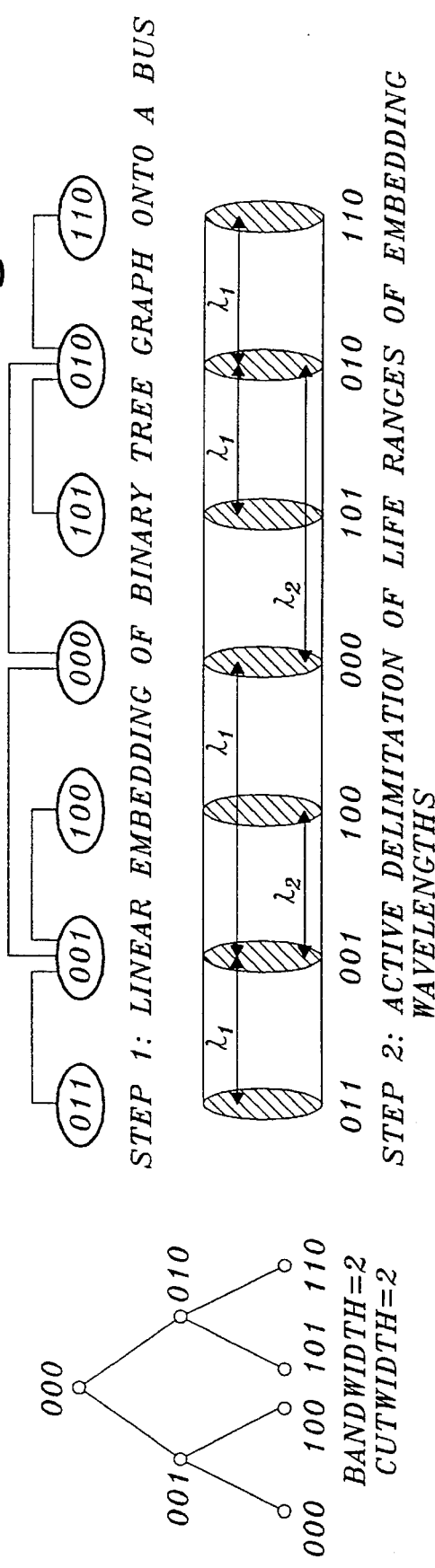

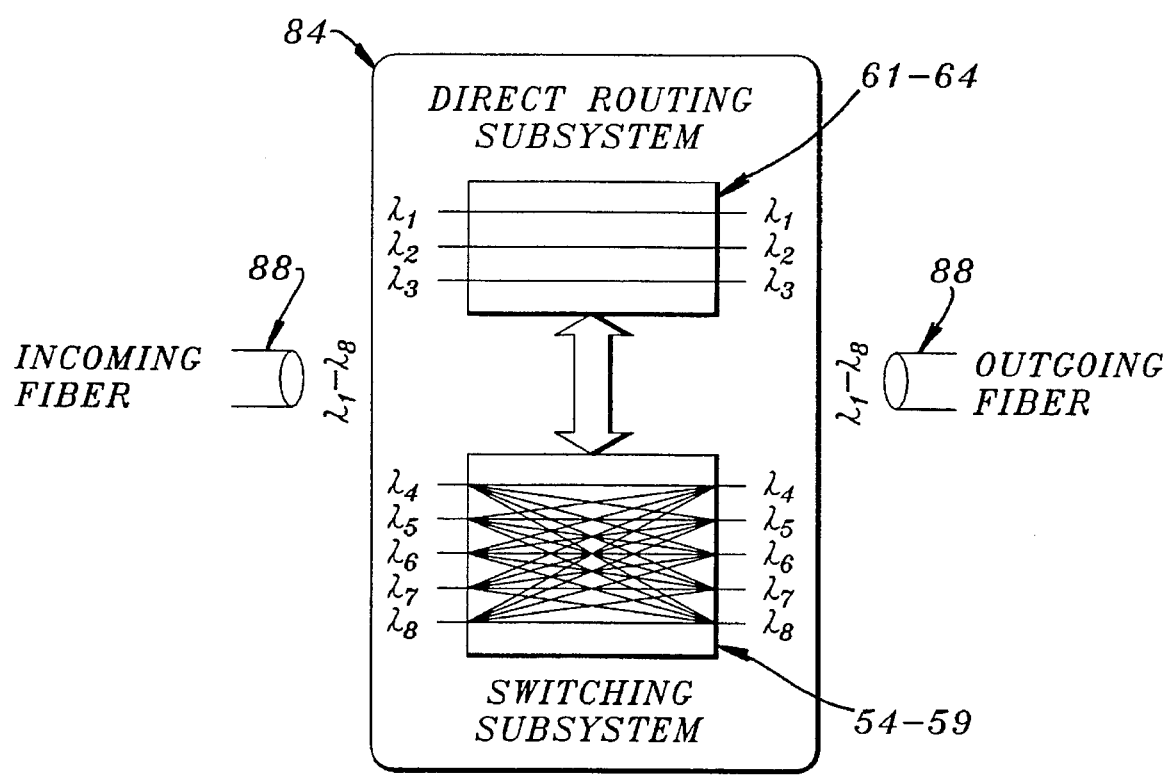

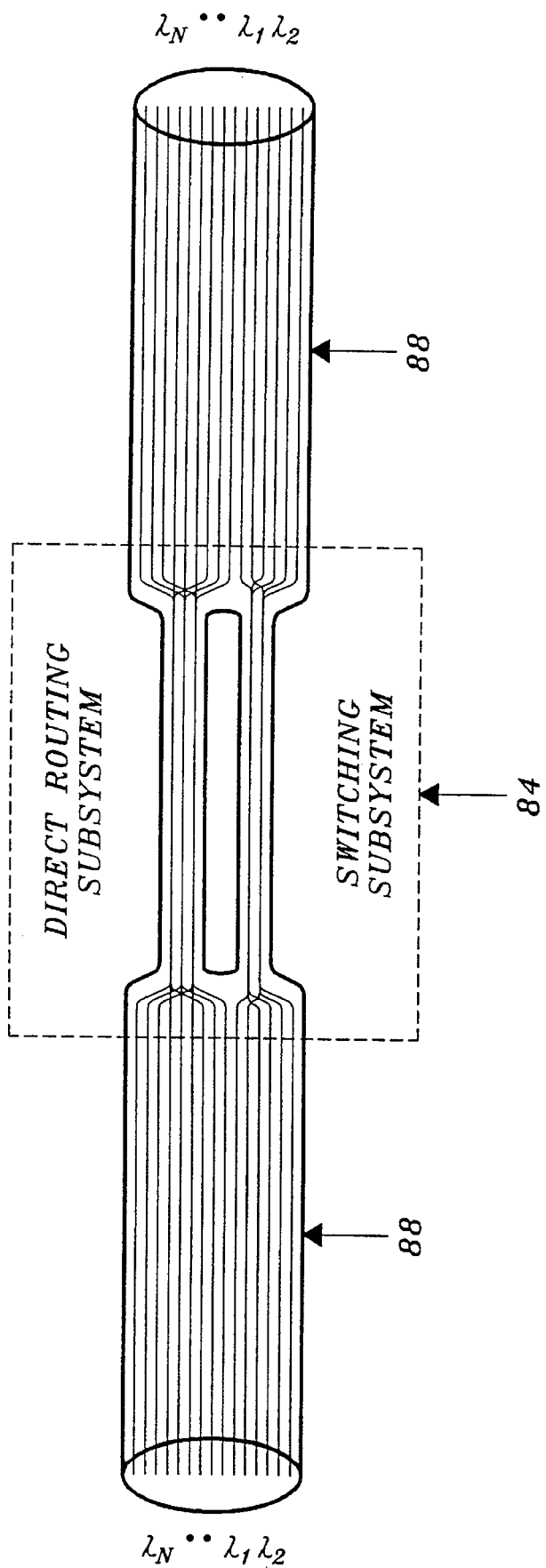

OPTICAL COMMUNICATIONS AND INTERCONNECTION NETWORKS HAVING OPTO-ELECTRONIC SWITCHES AND DIRECT OPTICAL ROUTERS

This invention was made with Government support under Contract No. ECD89-43166 awarded by the National Science Foundation. The Government has certain rights in this invention.

This invention relates to optical communications and interconnection networks, and more particularly, to optical networks having optical or electronic switches and direct optical routers at its nodes. The direct optical routers can erase an information signal from a carrier wavelength at a single node.

BACKGROUND OF THE INVENTION

As seen in FIG. 1, modern optical communication and interconnection networks have a plurality of nodes 1 through 10, connected by optical fiber links 21 through 28. Communication networks are typically used for telecommunications and data communications, and interconnection networks are found in multi-processor computer systems.

Several information signals can be simultaneously transmitted on each optical fiber on different carrier wavelengths by modulating optical carrier signals with the information signals and combining the modulated carrier signals through Wavelength Division Multiplexing (WDM). In WDM, several modulated carrier signals propagate along a single optic fiber. The number of signals depends in part on the bandwidth of the network, including the optic fibers.

As the number of nodes increases, the cost of interconnecting the nodes also increases. To control these costs, techniques have been developed for obtaining communications between all nodes through logical connections, without having physical connections between every pair of nodes. As seen in FIG. 1, users may desire a communication topology that provides direct communication channels between communicating parties, as indicated by the dashed lines connecting the nodes. However, the underlying fixed physical network topology is limited to the links 21–28, and provides only indirect communication paths to those nodes. In other words, in FIG. 1, each of the nodes 1 through 10 can exchange data with every other node, but the only physical connections are the links 20 through 28. Nodes 3 and 4 can communicate directly with each other. Nodes 4 and 6 can also communicate, though indirectly, through the node 9. As a result, excessive network latency and congestion may arise.

In known optical systems, indirect communications between nodes are made by providing shared optical or opto-electronic switches at each node. Incoming signals are demultiplexed at each node, demodulated, amplified if necessary, switched and re-modulated on the same or a different wavelength carrier signal. The signals are then multiplexed with other modulated carrier signals, and transmitted on a selected outgoing optical fiber to another node. When there is heavy traffic, however, the processing delay in the switch fabric slows the delivery of information packets or frames, which are generally processed either on a prioritized or a first in, first out basis. Since both continuous high volume (i.e., high bandwidth) users and bursty low volume users share the same channels and wavelengths, switching delay is a major problem, especially for the high bandwidth users. Thus, there is a need for optical networks having improved optical switching systems in their nodes, for decreasing the switch delay or network latency in communication and interconnection networks.

Another problem with known optical networks is that a separate carrier wavelength is needed for each information signal, even if a particular information signal is only transmitted over a short part of the network. This is inefficient because it limits the total number of information signals, often sent in packets or frames, which can be transmitted over the network at any particular time. Thus, there is also a need to use networks more efficiently, by allowing more than one information signal to be transmitted on a single carrier wavelength under appropriate circumstances.

Accordingly, one object of this invention is to provide new and improved optical network communication and interconnection systems.

Another object is to provide new and improved optical networks which reduce switching delay and network latency by selectively switching signals directly through at least some network nodes.

Still another object is to provide new and improved optical networks in which more than one information signal can be transmitted on a single carrier wavelength by erasing one signal at its destination node and immediately reusing the carrier by modulating it with a second information signal in the same node.

SUMMARY OF THE INVENTION

In keeping with one aspect of this invention, a multiple wavelength optical network includes a plurality of nodes, each of which can receive and transmit multiple wavelength carrier signals modulated with an information signal. The nodes include at least one switched optical coupler and at least one direct router, so that selected carrier signals can pass directly through the nodes without interruption.

In another aspect of the invention, wavelengths can be reused when there is a direct connection at a node, by biasing a series of amplifiers into saturation. Saturation erases the information signal from the carrier in a single node, so the same carrier signal can then be modulated with a second information signal. In this manner, two separate information signals can use a single wavelength simultaneously in different parts of the network.

BRIEF DESCRIPTION OF THE DRAWINGS

These and other features of this invention and the manner of obtaining them will become more apparent, and will be best understood with reference to the following description, taken in conjunction with the accompanying drawings, in which:

FIGS. 5A, 5B and 5C are diagrams of networks which use linear embedding;

FIG. 6 is a diagram of a node in the network of FIG. 5, made in accordance with the principles of this invention, the node having both direct routing and switching capabilities;

FIG. 8 is an illustrative diagram showing the combination of a direct routing subsystem and a switching subsystem at a node in the network of FIG. 6;

DETAILED DESCRIPTION

Figure 1:
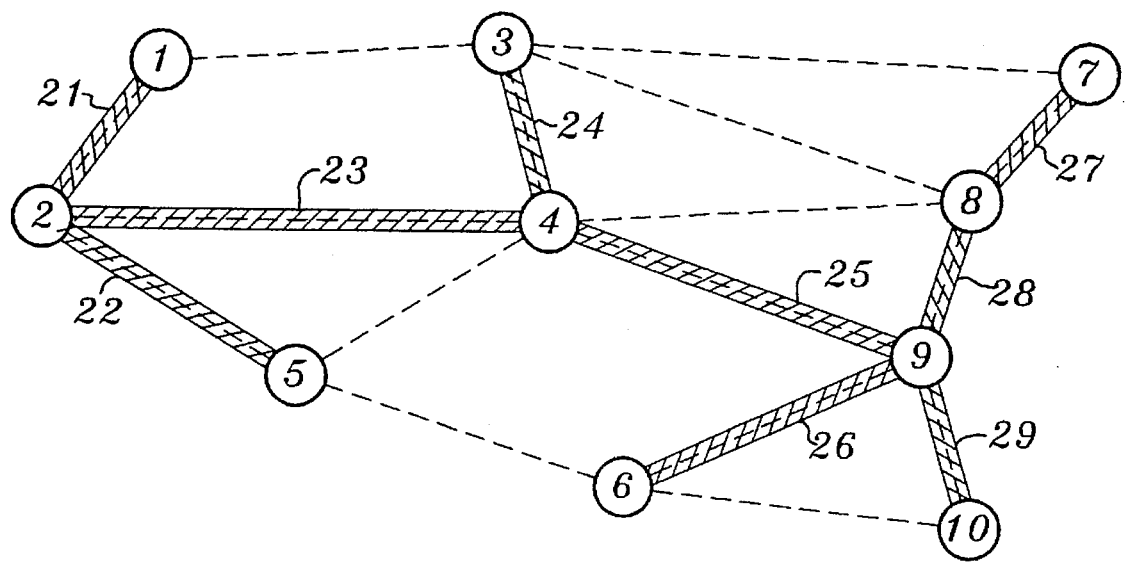
FIG. 1 is a diagram of a typical optical network.

As previously explained, a typical network 11 includes a plurality of nodes 1 through 10 connected by optical fiber links 20 through 28. The network 11 will be described as a telecommunications and data communications network, but it could also be used for multiprocessor interconnection networks, and the invention described here is applicable to multiprocessor interconnection networks, as well.

The bandwidth of the optical fibers in the links 21–29 is broad enough to accommodate at least the eight individual carrier wavelengths $\lambda_1$–$\lambda_8$ shown in the drawings. Commercially available fibers have bandwidths of at least 25 THz (200 nm) from low loss transmission windows at 1.3 microns and 1.55 microns, and can accommodate a much higher number of carrier wavelengths.

Each of the carrier wavelengths is typically amplitude modulated by an information signal. The information signal is typically digitally encoded binary data which is sent in units of packets or frames of information.

Each node is designed for two-way communications between linked nodes. Referring to FIG. 1, the nodes 1 and 2 can send and receive direct two-way communications over the link 21, and the nodes 4 and 6 can send and receive two-way communications through the node 9 and the links 25 and 26.

The node 9 can communicate with the nodes 4, 6, 8 and 10. Thus, each node has input circuitry for accepting packets from the node or nodes to which it is directly connected, and output circuitry for sending packets to those same nodes.

The node 9 includes input demultiplexers 31, 32, 33, 34 (FIG. 2) operatively connected to optical fiber links 25, 26, 28 and 29, respectively. The demultiplexers 31, 32, 33, 34 process signals received from the nodes 4, 6, 8 and 10, respectively. Output multiplexers 41, 42, 43, 44 are also operatively connected to the optical fiber links 26, 29, 25 and 28, for sending packets to the nodes 6, 10, 4 and 8, respectively.

The node 9 (FIG. 2) also includes a controller 53 and a plurality of optical switches 54, 55, 56, 57 and 58, tuned to $\lambda_4$, $\lambda_5$, $\lambda_6$, $\lambda_7$, and $\lambda_8$, respectively. The controller 53 controls the switches 54–58 to pass their carrier wavelength signals to a selected node. The controller 53 also stores information needed to establish the correct paths through the switches, and provides appropriate control signals to the respective switches to perform the actual switching as required. Among other things, packets can be transferred from a direct wavelength to a switched wavelength. Packets can also be received at the node 9 and delivered to a user, or received from the user and placed in the network at the node 9.

FIG. 3 shows an alternate embodiment of the node 9, in which an electronic switch 59 replaces the optical switches 54 through 58. The electronic switch 59 receives packets from adjacent nodes after optical detection in photodetector arrays 60, and modulates the packets optically through diode laser arrays 65, in accordance with signals provided by the controller 53.

Figure 4:
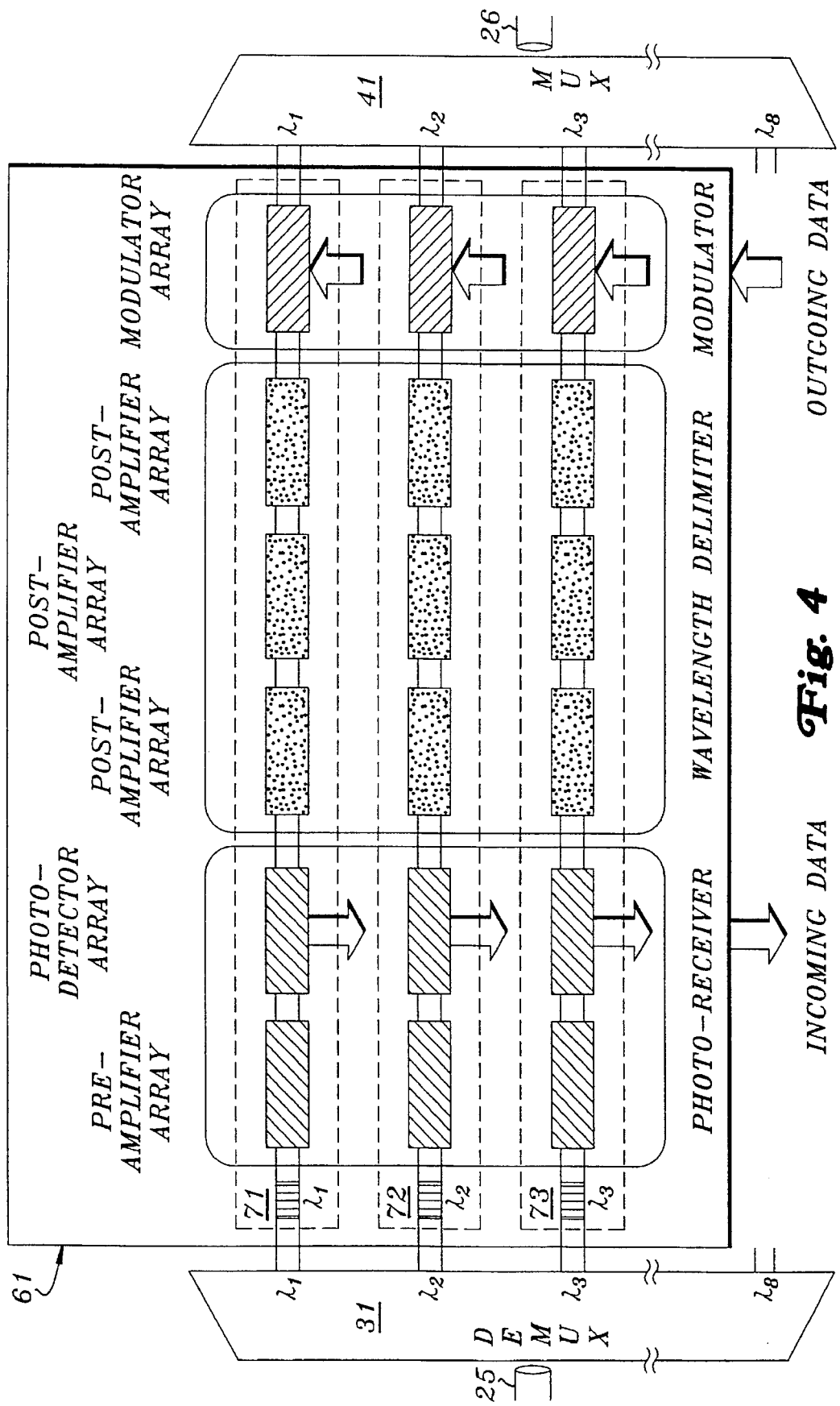
FIG. 4 is a diagram of a LEADER router array shown in FIGS. 2 and 3.

When using either the optical switches 54–58 or the electronic switch 59, packets are processed as required and sent to the correct output port depending upon the availability of the outgoing channel associated with that port. When multiple packets from different input ports are sent to the same destination output port, congestion can occur at the switches or the output ports of the node 9. The node 9 also includes four direct router arrays 61, 62, 63 and 64, each of which includes three Linear Embedding and Active Delimitation Electro-optic Routers (LEADER) 71, 72, 73 (LEADER 71 is shown in FIG. 4) tuned to $\lambda_1$, $\lambda_2$ and $\lambda_3$, respectively.

Figure 5A:
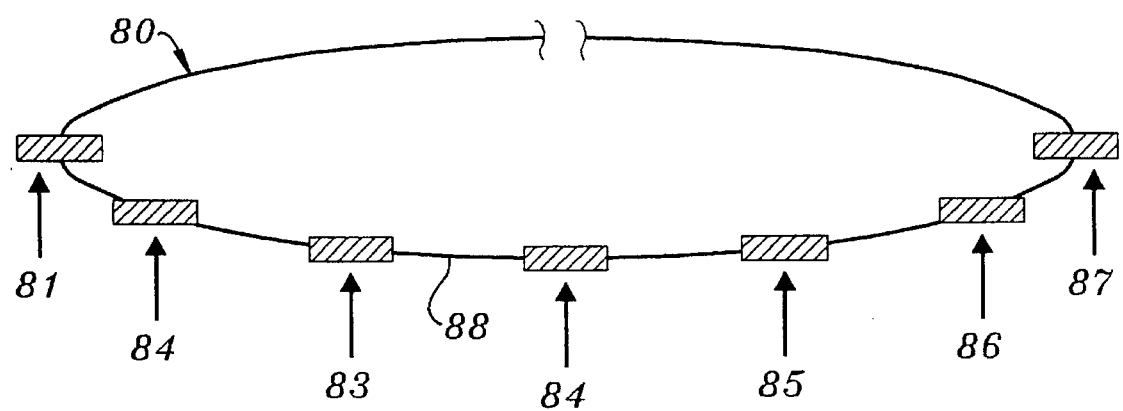

Linear embedding is a network design in which the nodes are connected in a single optical fiber path in a bus or a ring topology. As seen in FIG. 5A, a linear embedded network 80 includes nodes 81–87, connected by single optical path 88. Each node 81–87 can communicate with every other node 81–87, though many communications require routing through one or more intermediate nodes. Linear embedding is a cost effective way to provide re-configurable network topologies to satisfy user-desired communication topology needs within a single fiber, without resorting to multiple fiber bundles, or being restricted to a fixed physical topology. However, some connections may require direct routing through intermediate nodes to implement linear embedding in an efficient way.

FIGS. 5B and 5C show other implementations of linear embedding in networks. Among other things, those figures show how a single carrier can be used to transmit two or more information signals.

FIG. 6 shows the manner in which both direct routing and switching are used to implement linear embedding. Selected wavelengths such as $\lambda_1$ through $\lambda_3$ are routed directly through the node 84 without processing delays, while wavelengths $\lambda_4$–$\lambda_8$ are switched. The controller 53 (not shown in FIG. 6) can direct packets directly through the direct routing subsystem, on wavelengths $\lambda_1$–$\lambda_3$, or through the switching subsystem, on $\lambda_4$–$\lambda_8$. The packets can also be moved from a direct wavelength to a switched wavelength, if desired, by the controller 53.

Figure 7:
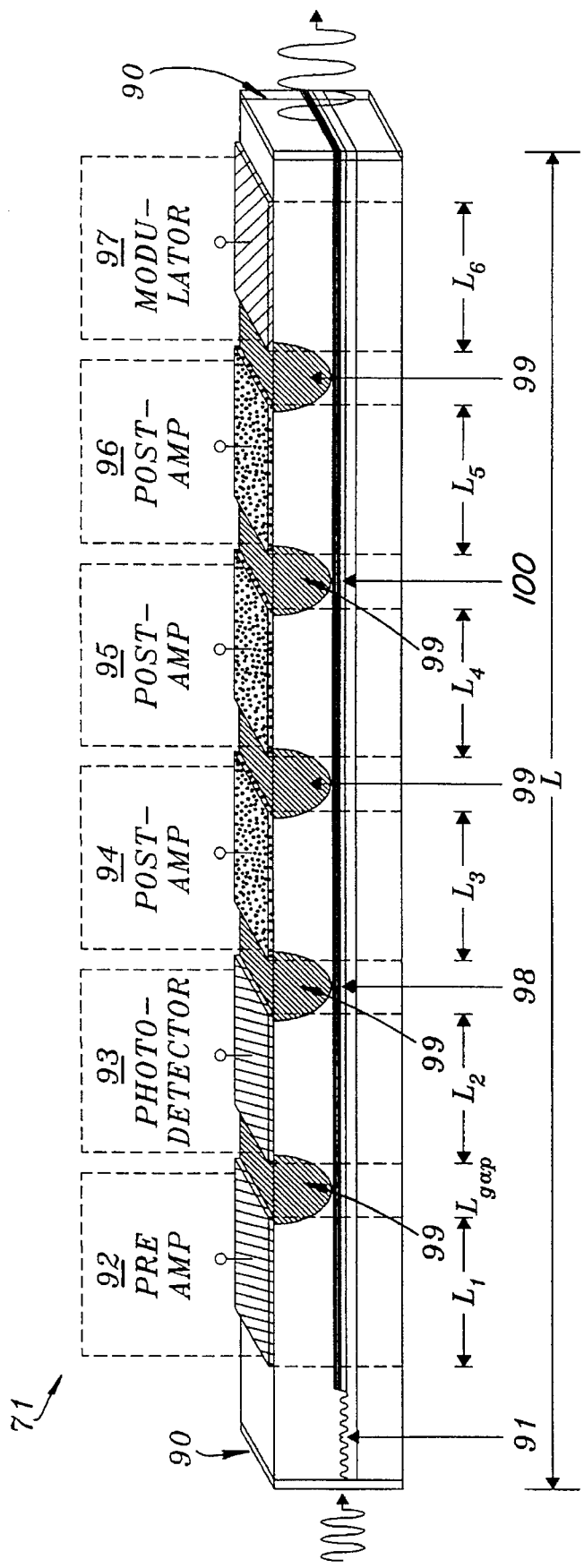
FIG. 7 is a diagram showing the construction of a LEADER direct optical router in the router array of FIG. 4, made in accordance with the principles of the invention.

Active delimitation is a way to limit the active range of a physical connection between a source and a destination, releasing portions of the network for reuse. This is accomplished by erasing the modulated signal from the optical carrier at its destination node, to release the optical wavelength for wavelength re-use. There are various ways to erase the modulated optical signal, but the LEADER device can erase it without interruption, or on-the-fly, optically and within a single node. The LEADER devices 71–73 are not switched, and can send signals directly from demultiplexers 31–34 to multiplexers 41–44, as directed by the controller 53. In FIGS. 2, 3 and 7, for example, the coupler 71 can send $\lambda_1$ from the node 4 to the node 6 without switching.

The effect of using direct or bypass routers on the performance of the overall network is seen in FIG. 8. The nodes in any system represent bottlenecks where traffic is slowed for processing and switching through the node. When all of the wavelengths are switched, as in known networks, all of the packets modulated on the wavelengths must be processed at every node. The addition of some direct routers relieves the node of some of the congestion created when only switches are used, by reducing the number of times a packet must be switched en route to its destination. Since switching is done selectively, much of this processing and switching delay can be reduced. At the same time, the combination of direct routers and switches maintains flexibility, allowing packets to be switched as needed to satisfy user needs. Flexible traffic control makes the system more efficient because packets can be easily re-routed to avoid congestion. Nodes can adapt to local traffic variations by adjusting the percentage of packets that are transmitted through direct routing and through switched wavelengths.

The construction of the direct router array 61 is shown in FIG. 4. A single router array may include several LEADER devices, including the direct router 71, shown in detail in FIG. 7. The carrier signals $\lambda_1$ through $\lambda_3$ on optical fiber link 25 are separated in the demultiplexer 31 (FIG. 4), and the $\lambda_1$ signal is sent to the LEADER 71. An antireflection coating 90 (FIG. 7) is provided at each end facet of the LEADER 71, to insure travelling wave propagation, without reflection or multi-pass transmission. A distributed feedback grating 91 can be provided, if desired, for independent demultiplexing or optical filtering. The $\lambda_1$ signal can be amplified in a pre-amplifier 92, and incoming data can be detected or received in a photodetector 93, if desired. Reception can be accomplished through the use of loop coupling, which leaves the carrier signal $\lambda_1$ intact in the LEADER device 71. If a direct connection is desired through the node 9 (FIG. 1) or the node 84 (FIG. 6), a multiple stage post-amplifier array which includes amplifiers 94, 95 and 96 (FIG. 7) can be used to amplify the signal to a desired level, and the signal passes through a modulator 97 and the output antireflection coating 90 to the multiplexer 41. The multiplexed wavelength $\lambda_1$ is then sent to the outgoing fiber 26 (FIG. 4). In this manner, the node 9 (FIG. 9) or the node 84 (FIG. 6) is effectively bypassed, and the signal $\lambda_1$ passes through the node quickly, without processing or switching delay.

On the other hand, if the node 9 is the destination of the $\lambda_1$ packet, then the information signal can be received by the photodetector 93. The data on the carrier $\lambda_1$ can then be erased by biasing the multiple stages of the post-amplifiers 94, 95 and 96 into saturation, causing a loss of the modulated signal on the carrier by gain compression, without destroying the carrier signal.

The LEADER device 71 is preferably a travelling wave semiconductor laser amplifier with active gain regions under the pre-amplifier 92 and the post-amplifiers 94–96. The gain regions can be implemented with a multiple quantum well structure 98. In the alternative, the gain regions could be implemented by double hetero-junction structures. Electrical isolation is provided by proton implants 99 between metal contacts. Passive waveguides 100 are formed beneath the active region 98, and together with the active region 98, form all optical path from input to output.

While the LEADER device is shown and described as an integrated semiconductor device, it could also be implemented by discrete optical components, including erbium-doped fiber amplifiers or the like.

Figure 9A:
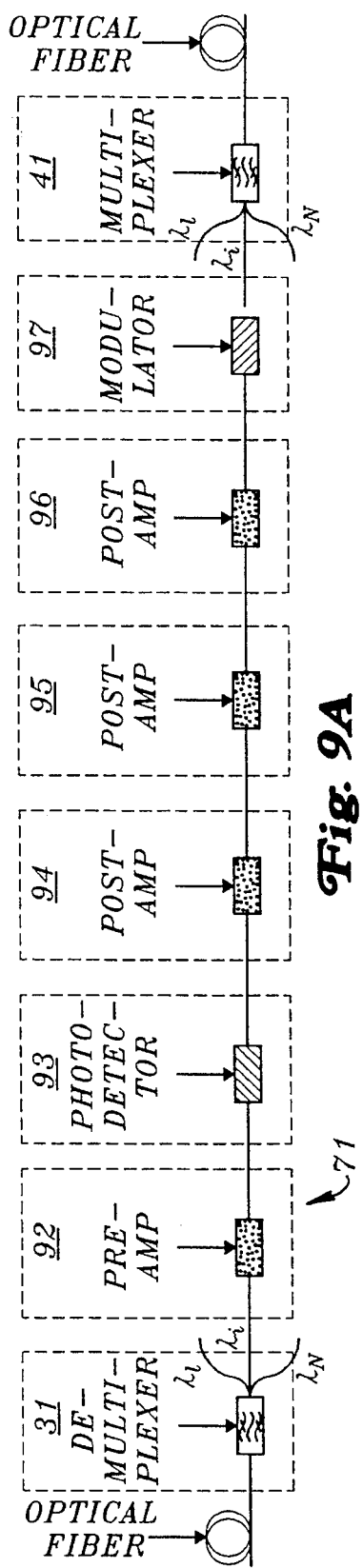
FIG. 9A is a block diagram of the LEADER router of FIG. 7.
Figure 9B:
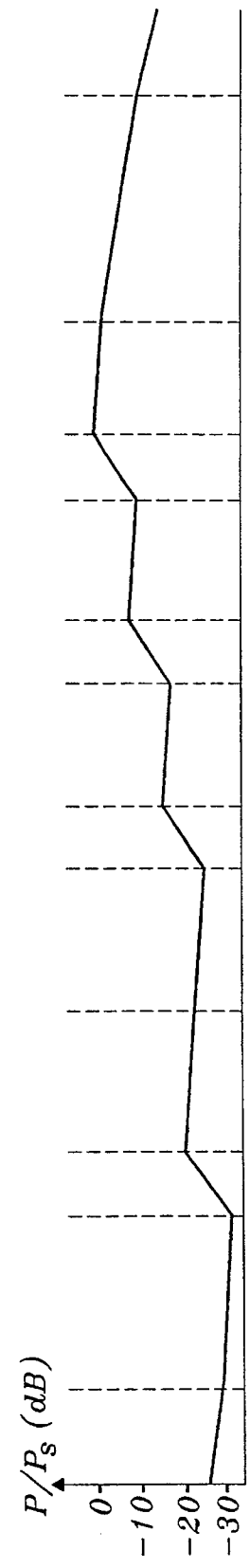
FIG. 9B is a graph showing carrier signal strength in the LEADER device of FIG. 9A.

The manner in which signals are erased in the LEADER devices is shown in FIG. 9. The LEADER device 71 is shown diagrammatically in FIG. 9A. FIG. 9B shows relative signal strength in the various stages of the LEADER device by measuring the optical signal power (P) relative to saturated output power (Ps). At the output of the demultiplexer 31, signal strength is low due to fiber attenuation and coupling losses. The preamplifier 92 increases signal power for reception in the photodetector 93. Once the packets have been received, the carrier wavelength can be immediately reused by erasing the modulated signal from the carrier. This is done through multiple stages of amplification in the post-amplifiers 94–96. The gain of each post-amplifier stage is seen in FIG. 9B. By operating each amplifier stage in saturation, the optical power of the modulated signal will increase toward the optical saturated output power. Due to the effects of gain compression, a "0" or low-state signal level will have a higher gain than a "1" or high-state signal level. As a result, the original modulated signal is erased after the three or more stages of amplification.

Figure 9C:
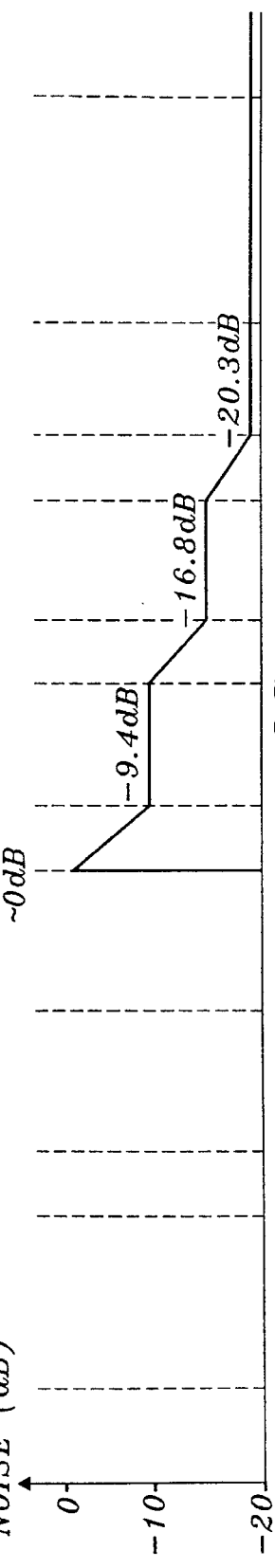
FIG. 9C is a graph showing the level of saturation of the carrier signal and erasure of the information signal in the LEADER device of FIG. 9B when the post-amplifiers are in saturation.

FIG. 9C shows the relative level of the original information signal on the carrier as it is reduced by each post-amplifier 94–96. At about −20 dB, there is no useful information on the carrier.

After the data is erased in the post-amplifiers 94–96, the carrier signal can be modulated with another data signal through the modulator 97. On-the-fly erasure and wavelength reuse are done within a single node. The single wavelength $\lambda_1$ is used to transmit two different data signals through different parts of the network, which is an efficient use of bandwidth. By erasing data in a single node, signal changes can be made immediately, in that node.

In typical multiprocessor interconnection networks, linear embedding the entire network can be implemented inside a single fiber using linear embedding, configured either as a ring or a bus physical topology. As seen in FIGS. 5B and 5C, this can be achieved by utilizing multiple wavelength channels as the physical connections in the original embedding networks, while employing active delimitation or erasing to define the actual length of the physical channel in the embedding networks, allowing the wavelengths to be used for multiple information signals. Thus, linear embedding and active delimitation, together with simple ring or bus topologies, achieve both logical and physical reconfigurable interconnection topologies in typical multiprocessor computer systems.

The many advantages of this invention are now apparent. The network is more efficient, and network delay is significantly reduced. Direct routers allow some information signals to pass through a node immediately, without waiting for other signals. Multiple signals can be transmitted on a single wavelength by erasing one signal from the carrier at its destination and replacing it with a second signal immediately, in the same node, without regenerating the carrier.

While the principles of the invention have been described above in connection with specific apparatus and applications, it is to be understood that this description is made only by way of example and not as a limitation on the scope of the invention.

What is claimed is:

1. An optical network for propagating multiplexed optical carrier signals modulated by information signals comprising:

a plurality of nodes, each of said nodes being capable of receiving and transmitting the carrier signals, at least one selected node including a demultiplexer, at least one direct optical router, at least one switch, and a multiplexer, a plurality of optical links connected between selected said nodes, each of said links being capable of propagating the carrier signals transmitted and received from said nodes, and a controller operatively connected to each of said nodes for controlling the propagation of the carrier signals and the information signals among various nodes throughout the network, said direct optical router having means for passing a first predetermined carrier signal directly through said selected node from a first predetermined link connected to said node to a second predetermined link connected to said node, said first predetermined carrier signal including a first information signal, said direct optical router further including, means for selectively erasing said first information signal from said carrier signal in said selected node and passing only said predetermined carrier signal through said selected node, means for selectively detecting said first information signal before it is erased, and means for selectively modulating said carrier signal with a second information signal after erasing said first information signal.

2. The network of claim 1 wherein the carrier signals are amplitude modulated.

3. The network of claim 1 wherein the carrier signals are amplitude modulated.

4. The network of claim 1 wherein the network is a communication network.

5. The network of claim 1 wherein the network is a multiprocessor interconnection network.

6. The network of claim 1 wherein the network is linearly embedded.

7. The network of claim 1 wherein said demultiplexer has an output for said first predetermined carrier, said direct router including a pre-amplifier having an input for receiving said first predetermined carrier from said demultiplexer output, means for amplifying said first predetermined carrier and an output, a photodetector connected to said pre-amplifier output for detecting a first information signal on said first predetermined carrier, said first predetermined carrier passing through said photodetector, a multiple stage post-amplifier array having an array input for receiving said first predetermined carrier from said photodetector, means for amplifying said first predetermined carrier, and an output, and a modulator array connected to said post-amplifier array output for selectively modulating said first predetermined carrier with a second information signal, said control means having means for biasing said post-amplifier array into saturation, to selectively erase said first information signal from said first predetermined carrier.

8. The network of claim 7 wherein said erasing is done on-the-fly.

9. A direct optical router for use in an optical network, the network propagating multiplexed optical carrier signals modulated by information signals and having at least one node connected to at least first and second additional nodes by first and second links, respectively, the optical router being part of the node and comprising:

means for passing a predetermined carrier signal directly through the node from the first link to the second link, means for selectively erasing a first information signal from the predetermined carrier signal and passing only the predetermined carrier signal through the node, means for selectively detecting said first information signal before said first information signal is erased, and means for selectively modulating the first predetermined carrier signal with a second information signal after erasing said first information signal.

10. An optical router comprising a pre-amplifier having an input for receiving a single carrier signal selectively modulated by a first information signal, means for amplifying said carrier signal, and an output, a photodetector connected to said pre-amplifier output for detecting said first information signal on said carrier signal, said carrier signal passing through said photodetector, a multiple stage post-amplifier array having an array input for receiving said carrier signal from said photodetector, means for amplifying said carrier signal and erasing said first information signal-on-the-fly, and an output, a modulator array connected to said post-amplifier array output for selectively modulating said carrier signal with a second information signal, and means for biasing said post-amplifier array into saturation, to selectively erase said first information signal from said carrier signal.

11. The router of claim 10 wherein said carrier signal is amplitude modulated.

12. An optical network for propagating multiplexed optical carrier signals modulated by information signals comprising:

a plurality of nodes, each of said nodes being capable of receiving and transmitting the carrier signals, at least one selected node including a demultiplexer, at least one direct optical router, at least one switch, and a multiplexer, a plurality of optical links connected between selected said nodes, each of said links being capable of propagating the carrier signals transmitted and received from said nodes, and a controller operatively connected to each of said nodes for controlling the propagation of the carrier signals and the information signals among various nodes throughout the network, said direct optical router having means for passing a first predetermined carrier signal directly through said selected node from a first predetermined link connected to said node to a second predetermined link connected to said node, said demultiplexer having an output for said first predetermined carrier, said direct router including a pre-amplifier having an input for receiving said first predetermined carrier from said demultiplexer output, means for amplifying said first predetermined carrier and an output, a photodetector connected to said pre-amplifier output for detecting a first information signal on said first predetermined carrier, said first predetermined carrier passing through said photodetector, a multiple stage post-amplifier array having an array input for receiving said first predetermined carrier from said photodetector, means for amplifying said first predetermined carrier, and an output, and a modulator array connected to said post-amplifier array output for selectively modulating said first predetermined carrier with a second information signal, said control means having means for biasing said post-amplifier array into saturation, to selectively erase said first information signal from said first predetermined carrier.

13. The network of claim 12 wherein said erasing is done on-the-fly.

* * * * *

UNITED STATES PATENT AND TRADEMARK OFFICE
CERTIFICATE OF CORRECTION

PATENT NO. : 5,610,744
DATED : March 11, 1997
INVENTOR(S) : Ho et al.

Page 1 of 2

Figure 2B:
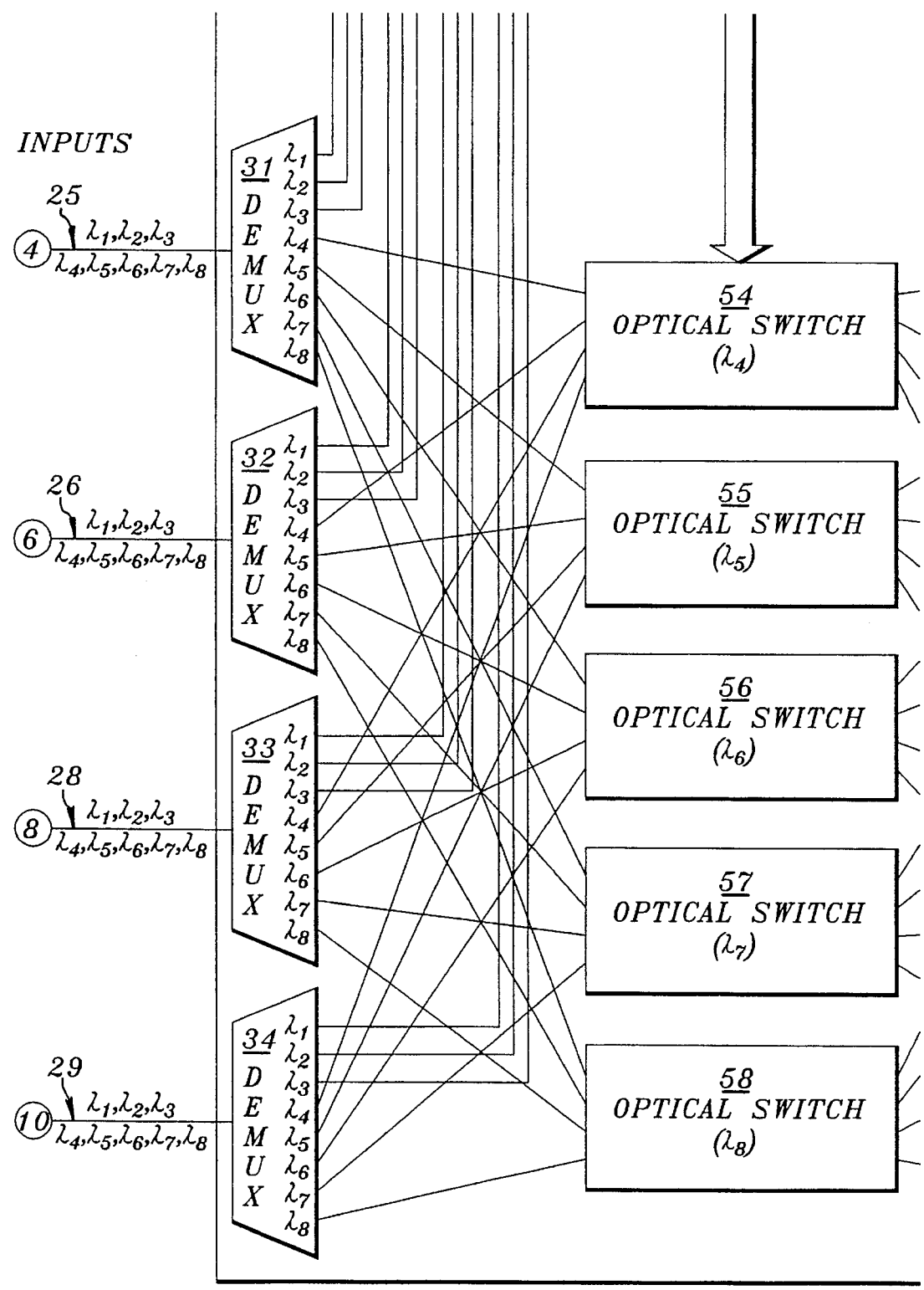
FIG. 2 is a diagram showing the construction of a node used in the network of FIG. 1, and made in accordance with the principles of this invention.
Figure 2C:
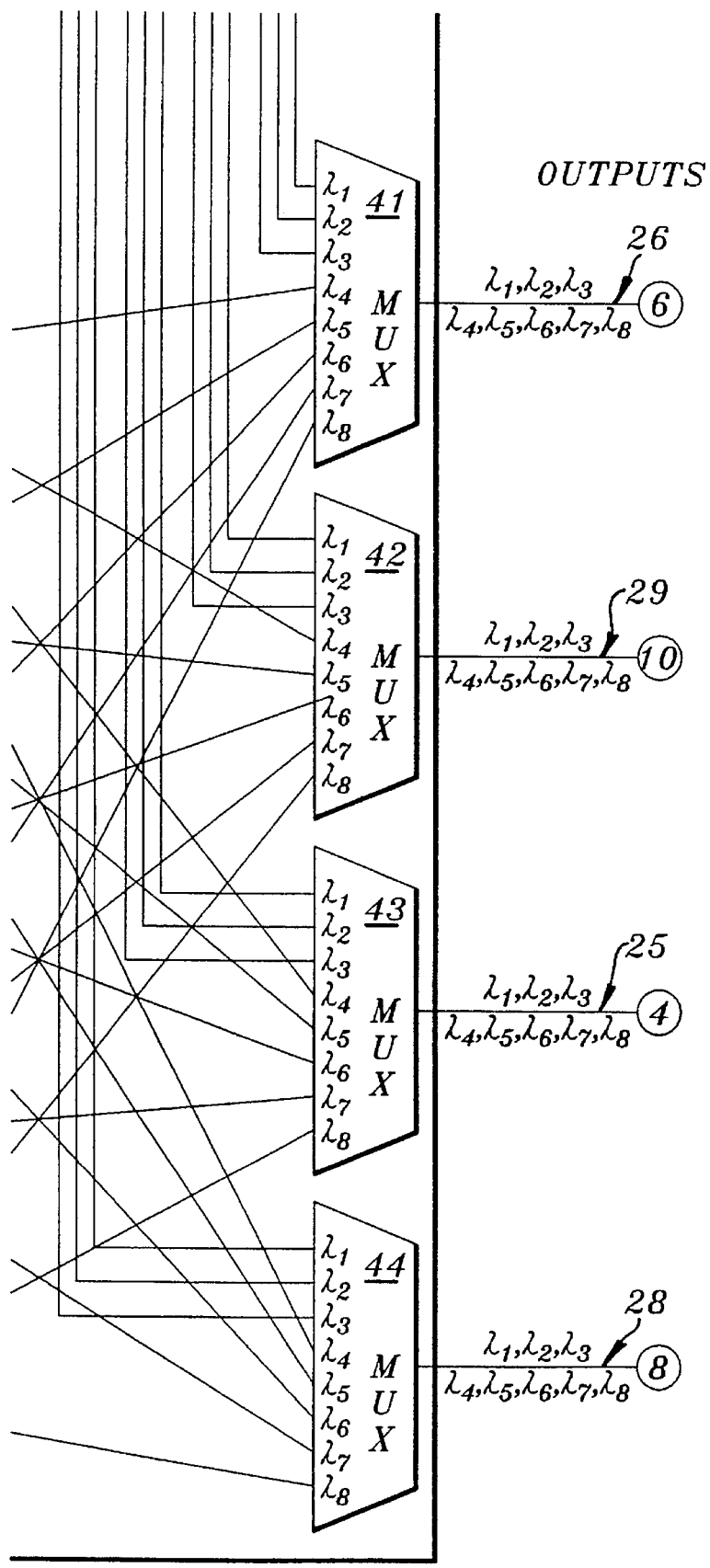

It is certified that error appears in the above-indentified patent and that said Letters Patent is hereby corrected as shown below:

Column 2, line 55, delete "FIG. 2 is" and insert --FIGS. 2A-2C constitute-- therefor.

Figure 3B:
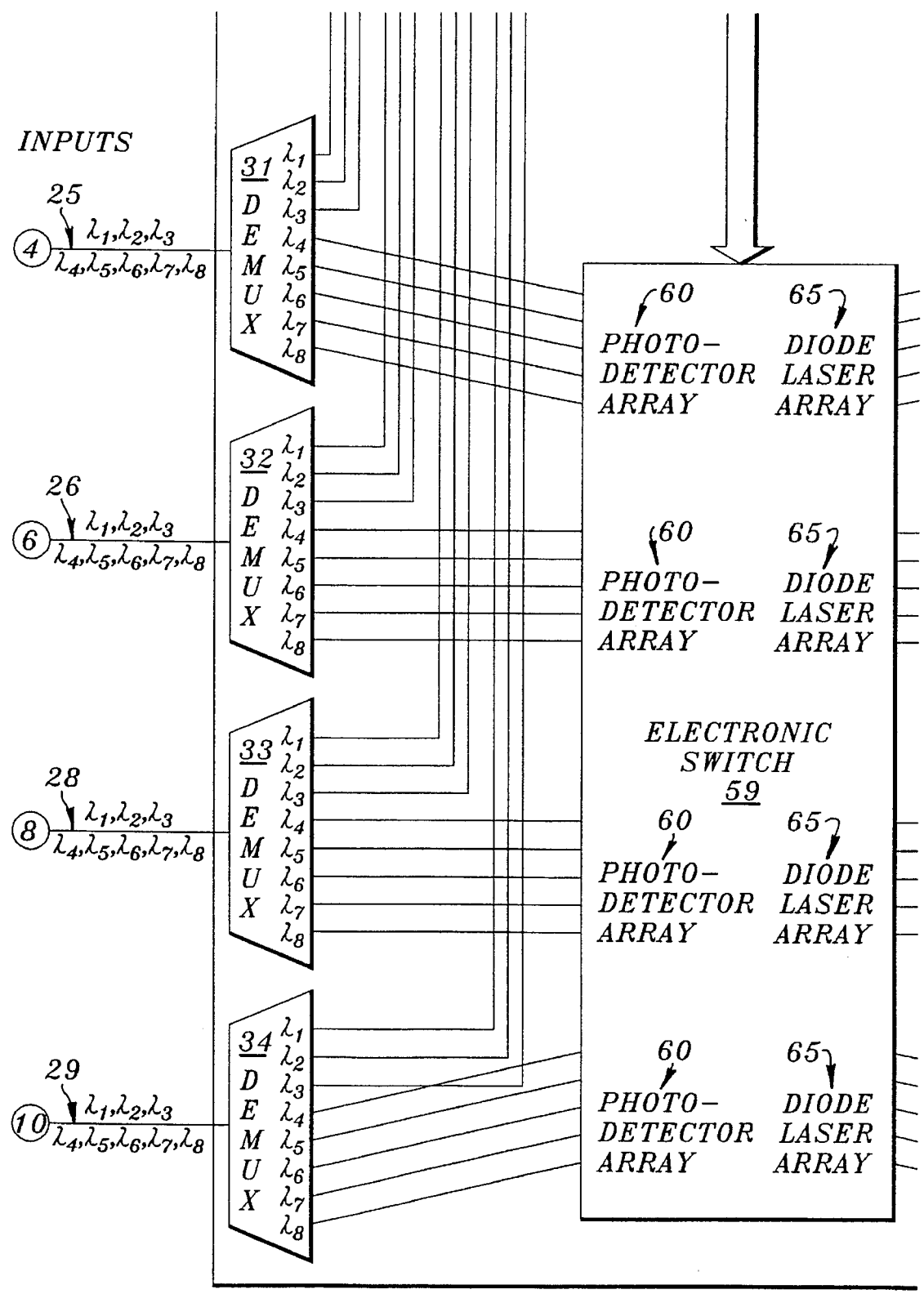
FIG. 3 is an alternate embodiment of the node construction of FIG. 2.
Figure 3C:
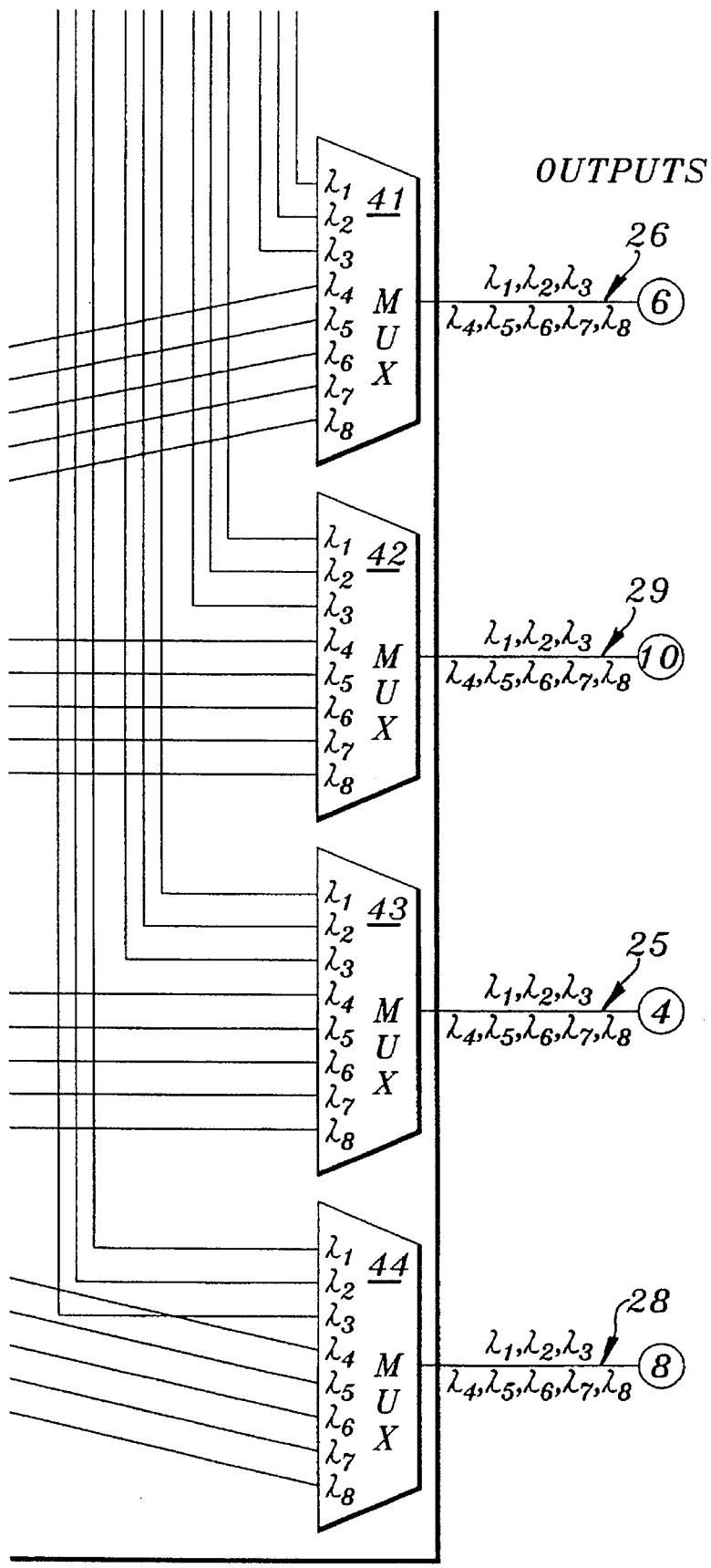

Column 2, line 58, delete "FIG. 3 is" and insert --FIGS. 3A-3C constitute-- therefor.

Column 2, line 59, delete "FIG. 2," and insert --FIGS. 2A-2C--therefor.

Column 3, line 47, delete "FIG. 2" and insert --FIG. 2B-- therefor.

Column 3, line 48, after "29", insert --(FIG. 2C)--.

Column 3, line 50, after "44", insert --(FIG. 2C)--.

Column 3, line 55, after "53", insert --(FIG. 2A)--.

UNITED STATES PATENT AND TRADEMARK OFFICE
CERTIFICATE OF CORRECTION

PATENT NO. : 5,610,744
DATED : March 11, 1997
INVENTOR(S) : Ho et al.

It is certified that error appears in the above-indentified patent and that said Letters Patent is hereby corrected as shown below:

Column 3, line 56, after "58", insert --(FIG. 2B)--.

Column 4, line 2, after "59", insert --(FIG. 3B)--.

Column 4, line 15, after "64", insert --(FIG. 2A or FIG. 3A)--.

Signed and Sealed this

Second Day of June, 1998

Attest:

BRUCE LEHMAN

Attesting Officer

Commissioner of Patents and Trademarks